United States Patent
Cognigni et al.

[11] Patent Number: 5,875,690
[45] Date of Patent: Mar. 2, 1999

[54] MULTISTAGE ANGULAR REDUCER

[75] Inventors: Enzo Cognigni; Pietro Depietri, both of Bologna, Italy

[73] Assignee: Bonfiglioli Riduttori S.p.A., Calderara Di Reno, Italy

[21] Appl. No.: 812,501

[22] Filed: Mar. 7, 1997

[30] Foreign Application Priority Data

Mar. 8, 1996 [IT] Italy ................................. BO96A0123

[51] Int. Cl.⁶ .................................................. F16H 57/02
[52] U.S. Cl. ......................................... 74/606 R; 74/420
[58] Field of Search ........................................... 74/606 R

[56] References Cited

U.S. PATENT DOCUMENTS

| | | | |
|---|---|---|---|
| 2,235,485 | 3/1941 | Jones | 74/421 A |
| 2,566,253 | 8/1951 | Schmitter | 74/420 |
| 2,596,794 | 5/1952 | Schmitter | 74/421 A |
| 2,869,384 | 1/1959 | Schmitter | 74/420 |
| 2,888,831 | 6/1959 | Malcom | 74/606 R X |
| 3,029,661 | 4/1962 | Schmitter | 74/606 R |
| 3,214,989 | 11/1965 | Wellauer et al. | 74/606 R X |
| 3,796,108 | 3/1974 | Kime et al. | 74/606 R X |
| 3,798,991 | 3/1974 | Kime et al. | 74/606 R X |
| 5,058,456 | 10/1991 | Manrique et al. | 74/606 R |
| 5,203,231 | 4/1993 | Minegishi et al. | 74/606 R |
| 5,634,374 | 6/1997 | Depietri | 74/420 |

FOREIGN PATENT DOCUMENTS

| | | |
|---|---|---|
| 0 617 214 A1 | 2/1994 | European Pat. Off. . |
| 2400793 | 3/1979 | France . |
| 2362505 | 12/1972 | Germany . |
| 1442839 | 7/1976 | United Kingdom . |
| 9410482 | 5/1994 | WIPO . |
| 632213A1 | 1/1995 | WIPO . |

*Primary Examiner*—Rodney H. Bonck
*Assistant Examiner*—Scott Luno
*Attorney, Agent, or Firm*—Birch, Stewart, Kolasch, & Birch, LLP

[57] ABSTRACT

A multistage angular reducer includes a casing, a drive shaft, a driven shaft connected to a user element, and a number of reduction stages housed inside the casing between the drive shaft and the driven shaft. At least one stage is defined by a pair of gears including a bevel pinion and a bevel ring gear. The casing may selectively house two or three reduction stages, while maintaining unchanged, when switching from two to three stages or vice versa, the mutual positions of the axis of the drive shaft and the axis of the driven shaft.

19 Claims, 2 Drawing Sheets

MULTISTAGE ANGULAR REDUCER

BACKGROUND OF THE INVENTION

The present invention relates to a multistage angular reducer, which, by means of straightforward alterations and using the same casing, provides for switching from a two-stage to a three-stage design or vice versa.

The main drawback of currently marketed reducers lies in the casing being designed to house either two or three reduction stages, with no possibility of varying the number of stages in the casing by means of straightforward operations during production. That is, it is not possible to switch from a two-stage to a three-stage design using the same casing, which lacks the seats for supporting the mechanisms required for converting the gear train from one design to the other.

Moreover, in most applications, the bevel pinion is only supported on one side and projects from the relative shaft, so that considerable stress is exerted on one bearing, the average working life of the bearing is reduced, and the casing must be dismantled frequently, thus resulting in considerable downtime. What is more, the fact that the bevel pinion, which is the main element in a the transmission, is supported in projecting manner results in considerable vibration, which in turn increases the noise level of the transmission.

The first stage of currently marketed motor reducers is nearly always defined by the bevel pinion meshing with a bevel ring gear, which means the stage producing the most vibration is located at the start of the gear train, thus increasing the noise level of the system as a whole.

SUMMARY OF THE INVENTION

It is an object of the present invention to provide a multistage angular reducer designed to overcome the aforementioned drawbacks.

According to the present invention, there is provided a multistage angular reducer of the type comprising:
 a casing;
 a drive shaft;
 a driven shaft connected to a user element; and
 a number of reduction stages housed inside the casing, between the drive shaft and the driven shaft, and wherein at least one stage is defined by a pair of gears defined by a bevel pinion and a bevel ring gear;
 wherein the casing is designed to selectively house two or three reduction stages, while maintaining unchanged, when switching from two to three stages or vice versa, the mutual positions of the axis of the drive shaft and the axis of the driven shaft. The casing of the angular reducer according to the present invention also comprising a first inner supporting element and a second inner supporting element for respectively supporting the two ends of the drive shaft to which the pinion is fitted.

In the case of a two-stage reducer, the bevel pinion is a hypoid bevel pinion.

BRIEF DESCRIPTION OF THE DRAWINGS

A number of preferred, non-limiting embodiments of the present invention will be described by way of example with reference to the accompanying drawings, in which (elements performing the same or similar functions are indicated using the same numbering system).

DETAILED DESCRIPTION OF THE INVENTION

Figure 1:
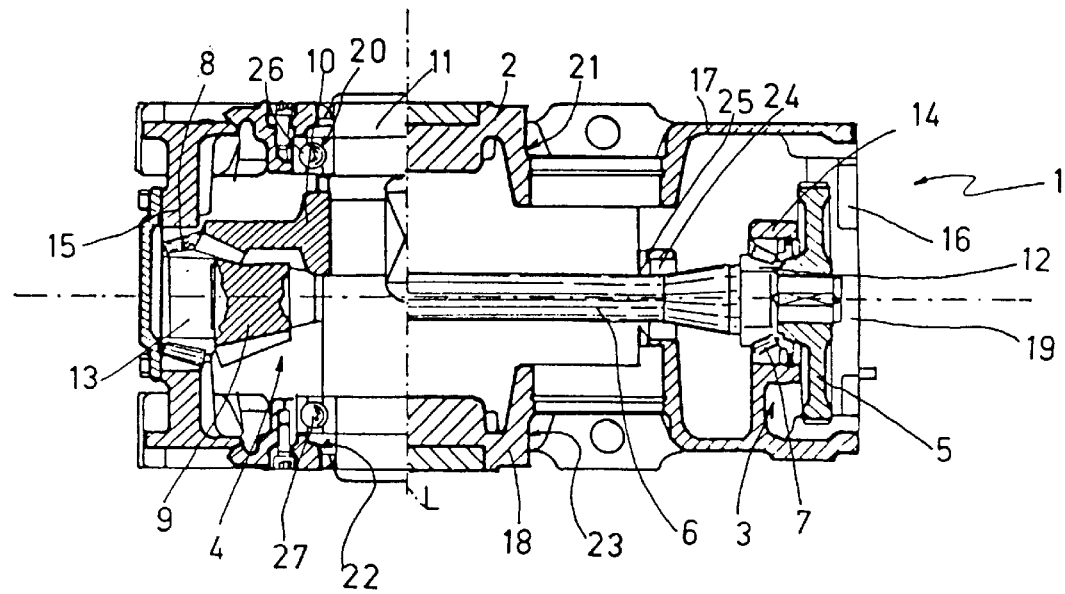
FIG. 1 shows a preferred embodiment of a two-stage angular reducer in accordance with the present invention.

In the FIG. 1 embodiment, the angular reducer 1 comprises two reduction stages 3, 4 housed inside a casing 2. The first stage 3 is defined by a pinion 34 (of axis K—FIG. 2) fitted to a shaft 35 and meshing with a second cylindrical gear 5 fitted to a shaft 6 supported by two bearings 7, 8.

The second stage 4 in the FIG. 1 embodiment is defined by a hypoid bevel pinion 9 meshing with a ring gear 10 integral with a driven shaft 11 (of axis L).

As shown in FIG. 1, hypoid pinion 9 is supported by the same shaft 6 to which cylindrical gear 5 is fitted, and which, as stated, is in turn supported by bearings 7, 8 housed inside respective seats 12, 13 formed respectively in a first inner supporting element 14 and in a first lateral wall 15.

Figure 2:
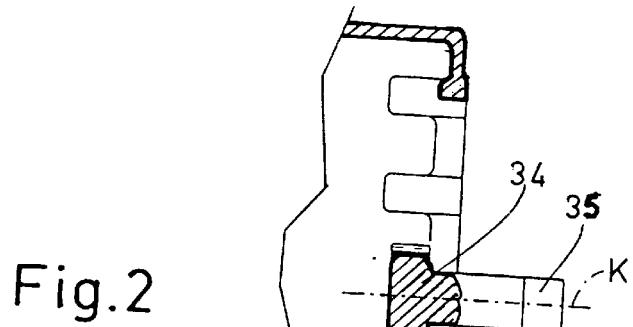
FIG. 2 shows the first reduction stage of the reducer according to the present invention.
Figure 3:
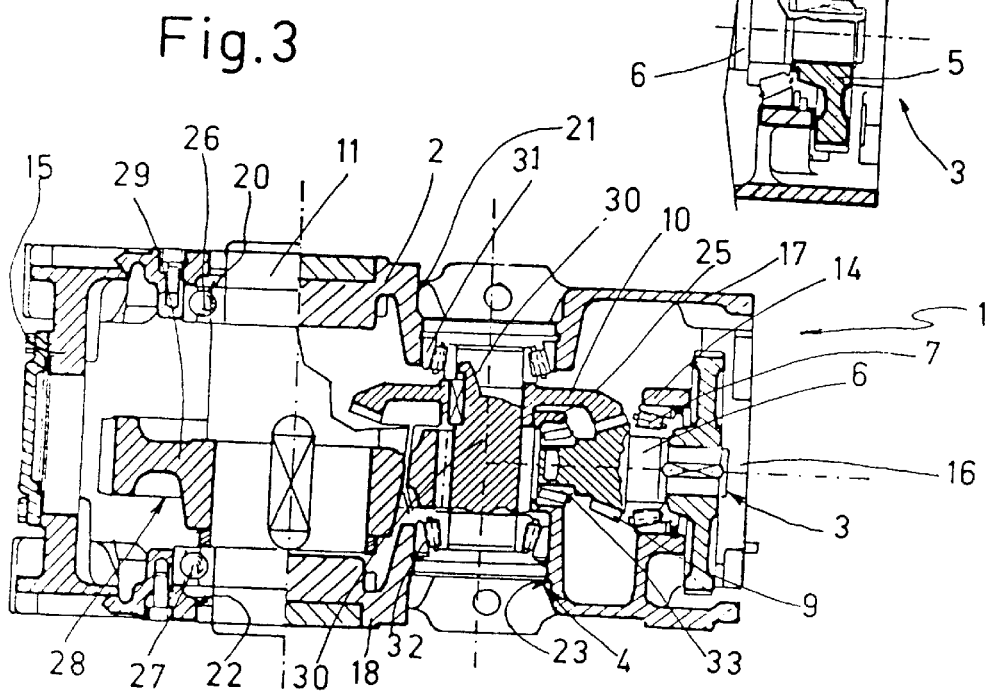
FIG. 3 shows a preferred embodiment of a three-stage angular reducer in accordance with the present invention and featuring the same casing as the FIG. 1 reducer.
Figure 4:
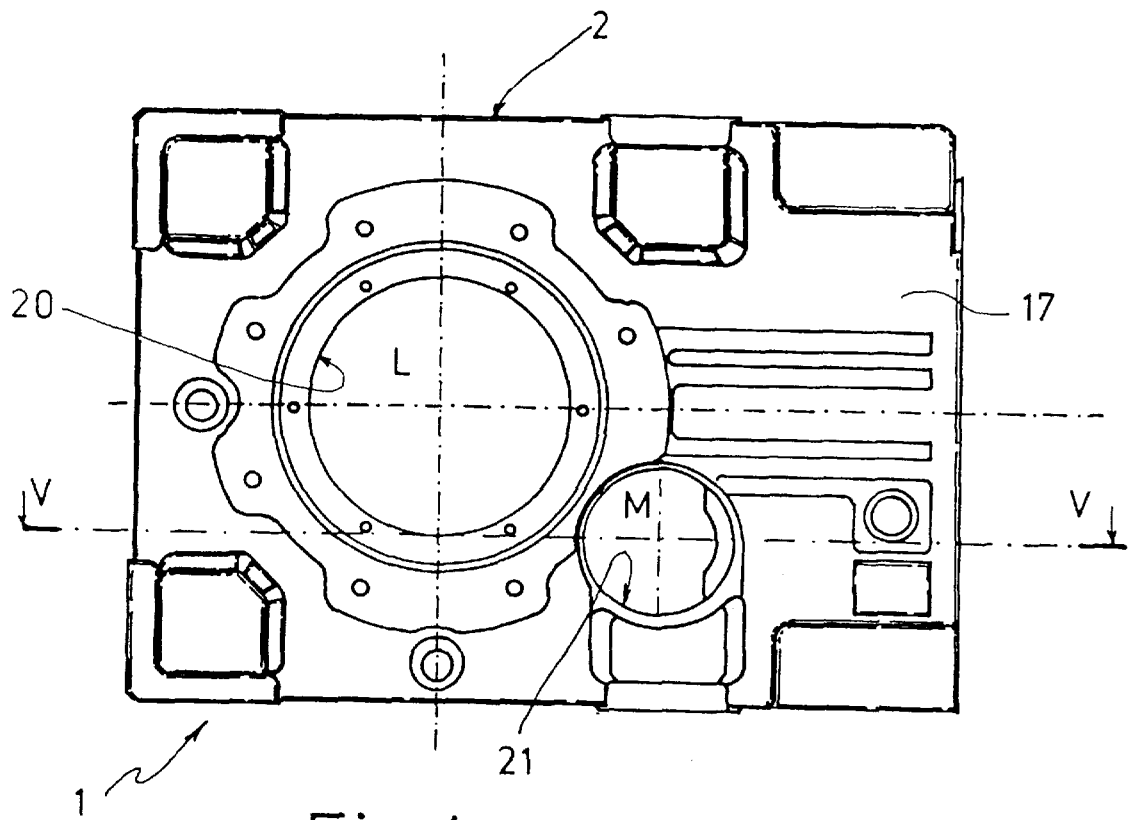
FIG. 4 shows a first side view of the casing of the reducer in FIGS. 1 and 3.
Figure 5:
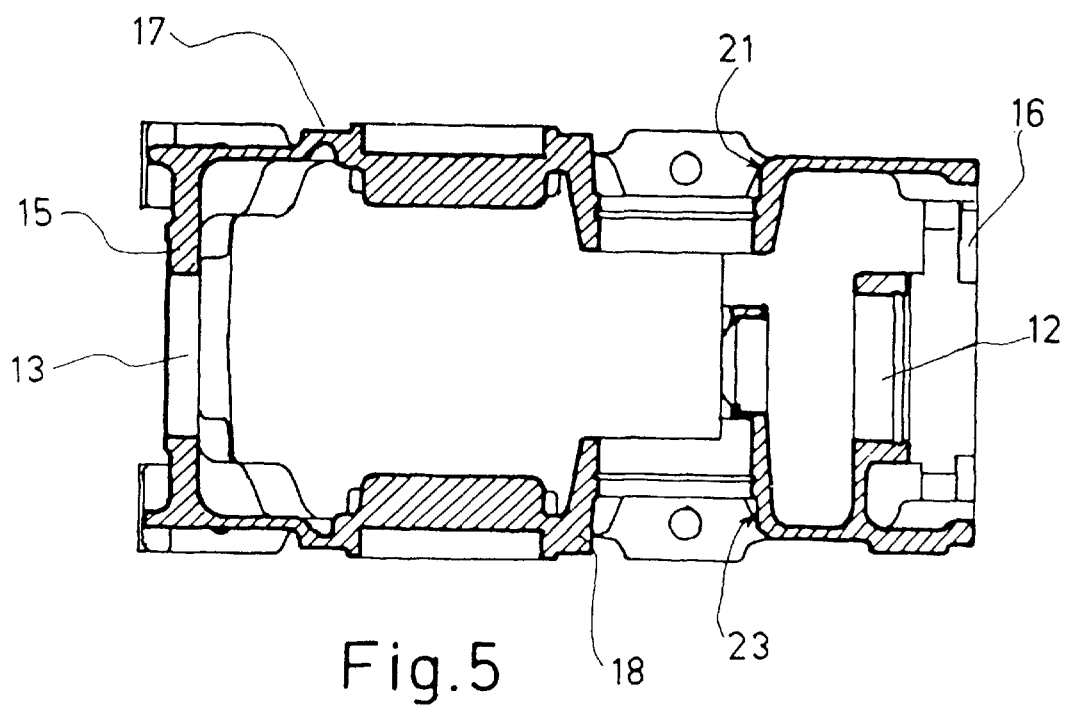
FIG. 5 shows a section of the first side view of the casing in FIG. 4.

In addition to the first lateral wall 15, the casing 2 also comprises a second lateral wall 16, a third wall 17, a fourth wall 18, and, to complete the box structure of casing 2, two additional lateral walls not shown in FIGS. 1–3.

The second lateral wall 16 comprises an opening 19 through which the pinion 34 meshes with the cylindrical gear 5; and third and fourth walls 17 and 18, which are substantially parallel and specular in relation to each other, comprise respective seats 20, 21 and 22, 23 for housing the bearings supporting the countershafts.

In FIG. 1, shaft 6, to which the hypoid pinion 9 is fitted, extends through a seat 24 formed in a second inner supporting element 25, the function of which is explained in detail later on; and the driven shaft 11, to which the bevel ring gear 10 is fitted, rests on two known bearings 26, 27 housed inside seats 20, 22 on the respective third and fourth walls 17, 18.

In the FIG. 1 two-stage embodiment, motion "enters" casing 2 via first reduction stage 3 defined by pinion 34 meshing with cylindrical gear 5, "passes" through second reduction stage 4 defined by hypoid pinion 9 meshing with bevel ring gear 10, and "leaves" from driven shaft 11 which drives a user element (not shown).

Hypoid pinion 9 is therefore supported by a shaft 6 in turn supported by two bearings 7, 8 on either side of pinion 9, so that the stress exerted on pinion 9 is adequately distributed, thus eliminating the drawbacks mentioned previously.

FIG. 3 shows seats 20–23 employed differently as compared with FIG. 1, and whereby the same casing 2, which in the FIG. 1 embodiment houses only two reduction stages 3, 4, may also accommodate a further third reduction stage 28 defined by a pinion 30 meshing with a gear 29.

With no alterations to opening 19 and seat 20 by which motion respectively "enters" and "leaves" the casing (or vice versa), the same casing 2 may therefore be used selectively for a reducer with two stages 3, 4 or three stages 3, 4, 28, thus enabling considerable saving in terms of production and storage cost.

In the three-stage angular reducer shown in FIG. 3, specular seats 21, 23, which are not used in the FIG. 1 embodiment, now serve to support the shaft supporting pinion 30 via a pair of bearings 32 in respective seats 31, which shaft is also integral with bevel ring gear 10 meshing with bevel pinion 9; and the second inner supporting element 25, formed in one piece with casing 2 (FIG. 1), supports a bearing 33 (FIG. 3), so that shaft 6 (shorter in FIG. 3 than in FIG. 1) rests on bearing 7 on one side and on bearing 33 on the other. In this case, too, bearings 7 and 33 are located on either side of bevel pinion 9 to better distribute the stress on the bearings and so prevent vibration within the system as a whole.

When switching from the two-stage 3, 4 reducer (FIG. 1) to the three-stage 3, 4, 28 design (FIG. 3) by replacing a number of elements in the gear train, the distance between axes K and L therefore remains unchanged.

The casing described provides not only for housing two or three reduction stages, but also for considerable advantages in terms of the noise level of the system as a whole, by virtue of two bearings being provided on either side of the hypoid pinion.

Clearly, changes may be made to the angular reducer as described and illustrated herein without, however, departing from the scope of the present invention.

We claim:

1. A multistage angular reducer comprising:
   a casing;
   a drive shaft;
   a driven shaft connected to a user element; and
   a number of reduction stages housed inside of said casing between said drive shaft and said driven shaft, at least one of said stages including a bevel pinion and a bevel ring gear;
   wherein said casing is selectively switchable from housing two reduction stages to housing three reduction stages and vice versa, while maintaining unchanged, when switching from said two reduction stages to said three reduction stages, mutual positions of an axis of the drive shaft and an axis of the driven shaft, and
   wherein three coaxially aligned supporting elements integral with said casing selectively support a bevel pinion shaft supporting said bevel pinion so that, in both two-stage and three-stage configurations, a pair of bearings supporting said bevel pinion shaft are located on axially opposite sides of said bevel pinion.

2. The angular reducer as claimed in claim 1, wherein said casing comprises two walls substantially parallel to each other and each having two seats; and
   two additional walls substantially parallel to each other, one of said two additional walls having a seat.

3. The angular reducer as claimed in claim 2, wherein, when said casing houses said two reduction stages, said bevel pinion is a hypoid bevel pinion;
   said seat in said one of said two additional walls receiving a first bearing of said pair of bearings for supporting a first end of said bevel pinion shaft, while a second end of said bevel pinion shaft is supported by a first inner supporting element by means of a second bearing of said pair of bearings.

4. The angular reducer as claimed in claim 2, wherein, when said casing houses said three reduction stages, a first end of said bevel pinion shaft is supported by a second inner supporting element by means of a first bearing of said pair of bearings, while a second end of said bevel pinion shaft is supported by a first inner supporting element by means of a second bearing of said pair of bearings.

5. The angular reducer as claimed in claim 4, wherein a ring gear shaft supporting said ring gear is supported by two bearings housed respectively in two of said seats in said two walls.

6. The angular reducer as claimed in claim 1, wherein a reduction stage defined by said bevel pinion and by said bevel ring gear is not a first reduction stage of said number of reduction stages.

7. The angular reducer as claimed in claim 1, wherein two of said three supporting elements are located on opposite sides of said driven shaft.

8. A multistage speed reducer comprising:
   a casing, said casing having first, second and third bearing supports arranged coaxially along a first axis;
   a drive shaft rotatable about a second axis;
   a driven shaft rotatable about a third axis;
   a plurality of reductions stages housed inside of said casing between said drive shaft and said driven shaft, at least one of said stages including a pinion and a ring gear;
   a pinion shaft supporting said pinion for rotation about said first axis; and
   a first pinion shaft bearing and a second pinion shaft bearing supporting said pinion shaft on axially opposite sides of said pinion;
   said multistage speed reducer being selectively reconfigurable between a two reduction stage configuration and a three reduction stage configuration, with mutual positions of the second axis of the drive shaft and the third axis of the driven shaft remaining unchanged in each of said configurations,
   wherein when said multistage speed reducer is configured in said two reduction stage configuration, said first pinion shaft bearing is arranged on said first bearing support and said second pinion shaft bearing is arranged on said third bearing support, and when said multistage speed reducer is configured in said three reduction stage configuration, said first pinion shaft bearing is arranged on said first bearing support and said second pinion shaft bearing is arranged on said second bearing support.

9. The multistage speed reducer according to claim 8, wherein said pinion is a bevel pinion.

10. The multistage speed reducer according to claim 8, wherein said pinion is a hypoid pinion.

11. The multistage speed reducer according to claim 8, wherein said pinion and ring gear comprise a second reduction stage of said plurality of reduction stages.

12. The multistage speed reducer according to claim 11, wherein a first reduction stage of said plurality of reduction stages comprises a pair of cylindrical gears.

13. The multistage speed reducer according to claim 8, wherein said first axis is parallel to said second axis.

14. The multistage speed reducer according to claim 13, wherein said first axis is perpendicular to said third axis.

15. The multistage speed reducer according to claim 8, wherein said first axis is perpendicular to said third axis.

16. The multistage speed reducer according to claim 8, wherein when said multistage speed reducer is configured in said two reduction stage configuration, said pinion shaft passes through said second bearing support.

17. The multistage speed reducer according to claim 8, wherein said pinion is a hypoid bevel pinion, and said first axis is parallel to said second axis and perpendicular to said third axis.

18. The multistage speed reducer according to claim 17, wherein said pinion and ring gear comprise a second reduction stage of said plurality of reduction stages.

19. The multistage speed reducer according to claim 18, wherein a first reduction stage of said plurality of reduction stages comprises a pair of cylindrical gear.

* * * * *